United States Patent
Cohen et al.

(10) Patent No.: US 7,624,762 B2
(45) Date of Patent: *Dec. 1, 2009

(54) FACING HAVING INCREASED STIFFNESS FOR INSULATION AND OTHER APPLICATIONS

(75) Inventors: Lewis S. Cohen, Needham, MA (US); Sebastianus Franciscus Maria van Beukering, Gouda (NL); Steven Wyer, Smethwick (GB)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/201,938

(22) Filed: Aug. 11, 2005

(65) Prior Publication Data

US 2006/0054235 A1 Mar. 16, 2006

Related U.S. Application Data

(63) Continuation of application No. 10/737,522, filed on Dec. 16, 2003, now abandoned, which is a continuation of application No. 10/731,847, filed on Dec. 9, 2003, now abandoned, which is a continuation-in-part of application No. 10/330,162, filed on Dec. 27, 2002, now abandoned.

(51) Int. Cl.
*F16L 9/14* (2006.01)
(52) U.S. Cl. .................. 138/149; 138/141; 138/137; 138/125; 138/146
(58) Field of Classification Search .............. 138/149, 138/141, 137, 125, 146
See application file for complete search history.

(56) References Cited

U.S. PATENT DOCUMENTS

| | | | | |
|---|---|---|---|---|
| 3,009,600 A | * | 11/1961 | Matsch | 220/560.13 |
| 3,058,704 A | | 10/1962 | Bergstedt | |
| 3,614,967 A | * | 10/1971 | Royston | 138/141 |
| 3,655,086 A | * | 4/1972 | Trenner | 220/560.05 |

(Continued)

FOREIGN PATENT DOCUMENTS

GB 2 108 046 A 5/1983

(Continued)

OTHER PUBLICATIONS

PET film (biaxially oriented)Dec. 27, 2006; Wikipedia; copies from website http://en.wikipedia.org/wiki/Mylar, pp. 1-3.*

(Continued)

*Primary Examiner*—James F Hook

(57) ABSTRACT

A covering for exposed insulation surfaces on fluid conduits for protection from moisture and other environmental factors. The covering typically includes a central fabric layer, such as a woven high density polyethylene fabric surrounded by structures having layers of alternating metal containing foils and puncture resistant polymers. The structures may be bonded to the central fabric layer by a polymer extrusion, such as a low density polyethylene extrusion. An acceptable metal-containing foil may includes aluminum foil, and the puncture resistant polymer may be polyester. The resulting covering may be cut with a hand-held implement, such as scissors or a knife or the like, may be formed into desired shapes manually and will retain the desired shape once formed. The overall thickness of the covering typically is no greater than about 350 microns.

26 Claims, 5 Drawing Sheets

U.S. PATENT DOCUMENTS

| | | | | |
|---|---|---|---|---|
| 3,715,265 | A | * | 2/1973 | Allen et al. ............... 428/143 |
| 3,948,295 | A | * | 4/1976 | Lemont et al. ............. 138/147 |
| 3,967,168 | A | | 6/1976 | Christensen |
| 4,054,710 | A | * | 10/1977 | Botsolas ..................... 442/31 |
| 4,271,218 | A | * | 6/1981 | Heckel et al. .............. 138/141 |
| 4,310,587 | A | * | 1/1982 | Beaupre ..................... 442/31 |
| 4,389,270 | A | * | 6/1983 | McClintock ............... 156/218 |
| 4,503,189 | A | | 3/1985 | Igarashi et al. |
| 4,595,615 | A | | 6/1986 | Cohen |
| 4,606,957 | A | | 8/1986 | Cohen |
| 4,699,830 | A | | 10/1987 | White |
| 4,778,703 | A | * | 10/1988 | Fontanilla ................. 428/40.6 |
| 4,780,347 | A | | 10/1988 | Cohen |
| 4,842,908 | A | | 6/1989 | Cohen et al. |
| 4,867,818 | A | | 9/1989 | Morgan |
| 4,888,247 | A | | 12/1989 | Zweben et al. |
| 4,927,705 | A | * | 5/1990 | Syme et al. ................ 428/192 |
| 4,946,732 | A | | 8/1990 | Cohen et al. |
| 5,104,701 | A | | 4/1992 | Cohen et al. |
| 5,158,831 | A | | 10/1992 | Schirmer |
| 5,400,602 | A | * | 3/1995 | Chang et al. ............... 62/50.7 |
| 5,783,268 | A | * | 7/1998 | Noonan et al. ............ 428/34.5 |
| 6,003,561 | A | * | 12/1999 | Brindza et al. ............ 138/124 |
| 6,207,271 | B1 | | 3/2001 | Daroux et al. |
| 6,316,110 | B1 | | 11/2001 | Anzaki et al. |
| 6,953,512 | B2 | * | 10/2005 | Cohen et al. ............... 156/248 |
| 2002/0104642 | A1 | * | 8/2002 | Garner ........................ 165/41 |
| 2004/0126597 | A1 | * | 7/2004 | Cohen et al. ............... 428/458 |
| 2004/0151922 | A1 | * | 8/2004 | Cohen et al. ............... 428/458 |
| 2005/0123732 | A1 | * | 6/2005 | Cohen et al. ............... 428/215 |
| 2005/0129896 | A1 | * | 6/2005 | Cohen et al. ............... 428/40.1 |

FOREIGN PATENT DOCUMENTS

| | | |
|---|---|---|
| WO | WO 01/53015 A2 | 7/2001 |

OTHER PUBLICATIONS

Venture Tape Corp., "VentureGuard™ Polymeric Insulation Facing Tape", Product No. 1576CW, Jan. 2002.
http://www.dpia.org/glossary/p.htmI; 2001.
Letter from Jack Kanz dated Nov. 1, 2006.
Polyguard Alumaguard 60™ Data Sheet, Nov. 26, 1998.
Office Action dated May 2, 2006, received in related U.S. Appl. No. 11/040,407, filed Jan. 21, 2005.
Office Action dated Oct. 20, 2006, received in related U.S. Appl. No. 11/040,407, filed Jan. 21, 2005.
Office Action dated Apr. 4, 2007, received in related U.S. Appl. No. 11/040,407, filed Jan. 21, 2005.
Office Action dated Feb. 6, 2008, received in related U.S. Appl. No. 11/040,407, filed Jan. 21, 2005.
Examiner's answer dated Oct. 3, 2008, received in related U.S. Appl. No. 11/040,407, filed Jan. 21, 2005.
PET Film (biaxially oriented) Dec. 27, 2006; Wikipedia; copies from website http://en.wikipedia.org/wiki/Mylar, pp. 1-3.

* cited by examiner

FACING HAVING INCREASED STIFFNESS FOR INSULATION AND OTHER APPLICATIONS

RELATED APPLICATIONS

This application claims the benefit under 35 U.S.C. § 120 and is a continuation of U.S. application Ser. No. 10/737,522 entitled "Facing For Insulation And Other Applications," filed on Dec. 16, 2003, now abandoned which is a continuation of application Ser. No. 10/731,847 entitled "Facing For Insulation And Other Applications," filed on Dec. 9, 2003, now abandoned which is a continuation-in-part of U.S. application Ser. No. 10/330,162, entitled "Facing For Insulation And Other Applications," filed on Dec. 27, 2002, now abandoned all of which are incorporated herein by reference in its their entirety.

FIELD OF THE INVENTION

This invention relates generally to insulation products for use with fluid conduits, such as pipes or ducts, and more particularly to a stiffened facing material for insulation surrounding fluid conduits for providing a vapor barrier and a weather seal.

BACKGROUND OF THE INVENTION

Pipes or ductwork in dwellings, commercial buildings and industrial plants are used for heating or air conditioning purposes, and therefore carry fluids, such as heated or cooled air or steam. In industrial applications, pipes or ductwork also may carry chemicals or petroleum products or the like. The ductwork typically is formed of aluminum or steel, while the pipes may be formed of any suitable material, such as copper, steel, aluminum, plastic, rubber or other like materials.

Such pipes or ductwork and associated heating or air conditioning units typically are covered with an exterior layer of insulation. The insulation used to cover such pipes or ductwork and associated heating and air conditioning units often includes fiberglass, mineral wool, foamed cellular glass or a rigid foam, covered by a jacket. Materials which may be used in the insulation jacket include a layer or layers of foil, a layer or layers of paper, such as a kraft paper, a scrim and a layer of polyester. Ductboard is often used to cover ductwork.

When such pipes or ductwork are in a location exposed to weather elements, or when they are in other environments where the exterior insulation surface is subject to degradation by moisture or the like, it is common to cover the insulation with a facing. This is particularly true for insulation having an exterior layer of paper or for ductboard, whether or not the exposed outer surface is a metalized layer or a paper layer, to protect the insulation from moisture, sun, wind and other weather elements. One of the most commonly used facings is sheet metal, such as galvanized steel or aluminum, for example 0.5 to 1.0 millimeter thickness sheets of aluminum. Typically, flat metal sheets are prefabricated for a particular application at a workshop remote from the application site. These flat metal sheets are formed into three-dimensional pieces that are shaped and sized to conform to the pipe, duct or other conduit that is to be covered. These pre-formed sheets are then mounted over the insulation at the worksite and are attached with metal bands or the like. Such sheet metal facing is particularly used on pipes, columns and equipment in chemical and petro-chemical plants. However, sheet metal facing has certain drawbacks. In the first place, the prefabrication of these metal sheets at the factory into a desired shape and size is very time-consuming and thus expensive. The subsequent application of these products to the insulation covered conduits is also a time-consuming process. The metal facing also can be very heavy and therefore difficult to handle and manipulate at the jobsite. Both prefabrication and application require a specially skilled labor force who must be trained. In addition, the resulting sheet metal facing has a large number of joints which often are not completely sealed and which permit water to pass therethrough and thereby to wet the insulation. This wetting of the insulation is undesirable, and can result in corrosion of the underlying equipment and conduits. Any repair work can be quite costly and time-consuming.

Another known solution includes covering the insulation with butyl rubber. However, this solution also has drawbacks including the fact that the butyl rubber does not perform well and has a poor appearance. A butyl rubber covering tends to delaminate at temperatures below 0° F. and above 120° F., and therefore should not be used in extreme weather environments where such exterior coverings are most desired and are often necessary. Butyl rubber is also very difficult to apply because it is messy to cut and form, and it is very heavy. Butyl rubber has also been known to cause delamination of the outer surface of the insulation from the fiberglass or the wool disposed in the interior of the insulation, because of its weight and because of its lack of strength at elevated temperatures. Butyl rubber also tends to creep, has poor fire and smoke ratings and therefore is not UL listed. Finally, solvents are required to activate butyl rubber at temperatures below 45° F.

It is also known to cover insulation with thin layers of aluminum foil using a butyl rubber adhesive. However, such coverings have little or no puncture resistance, and the butyl rubber adhesive layer has the same drawbacks noted above for butyl rubber facing, including a tendency to run or ooze at elevated temperatures.

Scrim and mastics are also used to cover insulation. However, the use of such materials is often very labor-intensive and requires a multiple step process. These products can only be applied during certain weather conditions, and it is very difficult to regulate the thickness of mastic to make it uniform. Consequently, such products have very limited applications and generate a poor appearance.

Another known product is bitumen felt and netting. This product is very labor-intensive to apply and is not recommended for exterior use. It also has a very poor fire rating and is unsightly. Its use, therefore, is very limited.

There exists a need for a facing material for covering insulation, particularly exterior insulation, that is relatively inexpensive, easy to apply, can be easily cut with scissors or a knife, is puncture-resistant and has the strength, rigidity and resistance to corrosion of conventional aluminum facing.

SUMMARY OF INVENTION

This invention relates generally to a facing material for application to exposed surfaces of insulation or other like materials to provide a vapor seal and to protect the insulation from weather-related damage. The facing of this invention overcomes the drawbacks of the prior art systems discussed above, since it is relatively inexpensive, is easy to apply, provides a good appearance, is easily cut and manipulated at the job site, and provides substantially a 100% vapor seal. The facing of this invention can be molded manually to conform to the shape of the surface being covered, and the facing will retain that shape once molded. The facing of this invention also can be applied and will maintain its integrity in extreme weather conditions and is very fire-resistant.

In one aspect, a covering for insulation is disclosed. In one embodiment of this aspect, the covering includes a central layer, a polymer extrusion layer disposed on each side of the central layer, and two structures, one structure affixed to each polymer extrusion layer, each structure comprising alternating layers of a metal-containing foil and a puncture-resistant polymer film. In another embodiment, at least one layer of a metal-containing foil in each structure includes a sheet of aluminum foil. In yet another further embodiment, at least one layer of puncture-resistant polymer film in each structure is formed of a polyester film. In yet another further embodiment, the central layer comprises a woven fabric which may be formed of polyethylene, or a non-woven fiberglass. The extrusion may be formed of a low-density polyethylene. The covering of this embodiment may be sufficiently rigid to retain a shape once formed into that shape, and may be cut using a hand-held implement with a sharp edge. The covering may have a total thickness of no greater than about 350 microns.

In yet another embodiment, at least one of the structures includes three layers of a metal-containing foil and two layers of a puncture-resistant polymer, at least one layer of the metal-containing foil being disposed on a outer surface of the covering. In this embodiment, an outer layer of a metal-containing foil is approximately 25 microns in thickness, and all of the other layers of a metal-containing foil are approximately 9 microns in thickness, and the layers of a puncture-resistant polymer film are approximately 23 microns in thickness. In yet another further embodiment, at least one of the structures includes two layers of a metal-containing foil having a layer of a puncture-resistant polymer film disposed therebetween, and in this embodiment, each layer of a metal-containing foil is approximately 25 microns in thickness, and the layer of a puncture-resistant polymer film is approximately 23 microns in thickness.

In another aspect, a weather seal for use on exposed surfaces is disclosed. The weather seal in one embodiment includes a first outer layer of aluminum foil which has an outer surface and an inner surface, a layer of polyester bonded to the inner surface of the first outer layer of aluminum foil, a second layer of aluminum foil bonded to the layer of polyester, a layer of fabric, a first layer of a polymer extrusion bonding the second layer of aluminum foil to the layer of fabric, the first layer of an extrusion having a melting temperature lower than a melting temperature of the layer of fabric, a third layer of aluminum foil, a second layer of a polymer extrusion bonding the fabric layer to the third layer of aluminum foil and having a melting temperature below the melting temperature of the fabric layer, a second layer of polyester bonded to the third layer of aluminum foil, and a fourth layer of aluminum foil bonded to the second layer of polyester. In another embodiment, there is a fifth layer of aluminum foil and a third layer of polyester disposed between the first and second layers of aluminum foil, and a sixth layer of aluminum foil and a fourth layer of polyester disposed between the third and fourth layers of aluminum foil. In another embodiment, the second, third, fourth, fifth and sixth layers of aluminum foil have a thickness of no greater than about 9 microns. In yet another embodiment, the first and second layers of polyester have a thickness of no greater than about 23 microns. In yet another embodiment, the fourth layer of aluminum foil is covered on a side opposite the second layer of polyester with a layer of a pressure-sensitive adhesive. In yet another further embodiment, each layer of aluminum foil has a thickness of no greater than about 25 microns, and each layer of polyester has a thickness of no greater than about 23 microns.

In yet another aspect of the invention, a weather seal for covering exposed insulation surfaces on fluid conduits is disposed. In one embodiment, the weather seal includes a central fabric layer having a pattern, one structure bonded to one side of the central fabric layer and another structure bonded to the other side of the central fabric layer, each structure including multiple alternating layers of a metal foil and a puncture-resistant polymer bonded together with an adhesive, the weather seal being manually bendable into a desired configuration, the weather seal retaining the desired configuration once a manual force is removed, the weather seal being manually cutable with a hand-held implement. In another embodiment, there is a polymer extrusion disposed on either side of the central fabric layer for bonding the two structures to the central fabric layer. In one embodiment, the weather seal may have a puncture resistance of at least 40 kilograms as measured in accordance with ASTM D-1000, and a tear strength of at least 7.60 kilograms as measured in accordance with ASTM D-624. In another embodiment, the total thickness of the weather seal does not exceed about 350 microns.

BRIEF DESCRIPTION OF DRAWINGS

The objects, advantages and features of this invention will be more clearly appreciated from the following detailed description, when taken in conjunction with the accompanying drawings, in which.

DETAILED DESCRIPTION

Figure 1:
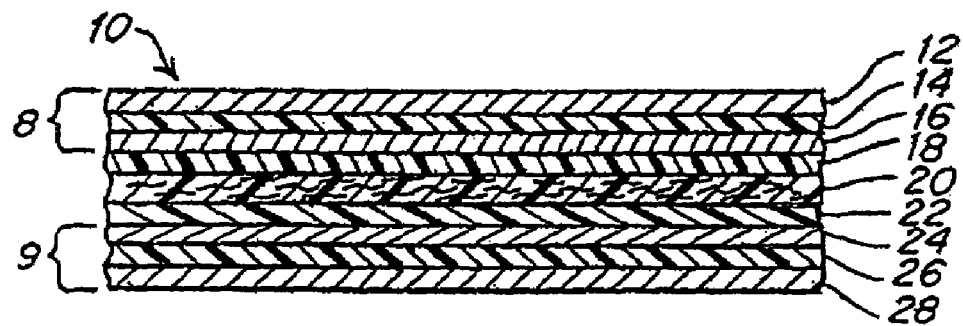
FIG. 1 is a cross-sectional view of a cutaway portion of one embodiment of the facing of this invention.

With reference now to the drawings, and more particularly to FIG. 1 thereof, one embodiment of the facing 10 of this invention will be described. Facing 10 includes a central layer, which may be a layer of fabric, and, on each side of the central layer, a structure having alternating layers of a metal-containing foil and a puncture-resistant polymer film bonded to the central layer by an extrusion layer. The layers of foil in the structure provide the desired vapor seal, weather resistance, and a desirable exterior appearance. The layers of polymer in the structure provide puncture and tear resistance, particularly with respect to birds and other animals. The central layer provides additional tear resistance, strength, and a desired textured appearance. The extrusion layers provide further strength. All of these layers of material together provide the desired fire resistance and resistance to flame spread. The central and extrusion layers together also provide additional stiffness to the facing, allowing it to retain a shape into which it has been formed, while still allowing the laminate to be easily cut using a hand-held implement, such as scissors, a knife or the like so that the product can be cut to size at the jobsite. As used herein, the term "hand-held implement" or "hand implement" means a device with a sharp edge that is manually operated or operable to cut a sheet of material, such as a knife or scissors or box cutter, and specifically excludes machinery, a saw or any implement that has a power assist. Moreover, the stiffness is not so great as to prevent the facing from being manually formed into the shape of the structure to be covered.

The number of layers of foil and polymer, the thickness of each of the layers and the actual materials used to form each layer are chosen to provide a facing which optimizes each of the desired properties. For example, thick layers of metal would provide additional resistance to weathering, impermeability to moisture, resistance to puncture and additional strength and rigidity. However, if the metal layers become too thick, they cannot be easily cut with a hand-held implement and manually formed for application at the job site. Also, if the metal layers are too thick, the facing could become too heavy to be easily manipulated and applied by the average worker. Similarly, additional layers of a polymer film, or a greater thickness of polymer film would increase the puncture resistance of the facing but could also increase the weight, reduce the conformability and render cutting more difficult, thus making the facing very difficult to apply at the job site and to conform to the shape of the fluid conduits about which it is to be wrapped. Similarly, if the central and extrusion layers are too thick, the material would be too rigid to be easily conformed. In addition, it is desirable to have the texture of the central layer, such as a fabric pattern, show through to the exposed surface of the facing to provide a finish and texture that will hide imperfections. Therefore, if the foil, polymer film and extrusion layers are too thick, the texture of the central layer will not be imposed upon the surface layers of the facing. In addition, different materials also provide different advantages. For example, steel provides greater strength and puncture resistance, while aluminum is lighter in weight, less expensive, more easily cut and more flexible. While polytetrafluoroethylene (PTFE) is waterproof, it is hard to cut and expensive. Polyester is less expensive and easier to cut and use than PTFE.

Conformability of the facing to the fluid conduits should be considered as well, as any failure of the facing to conform to the shape of the insulation surrounding the conduit could produce gaps through which moisture or wind could enter, thus destroying the weather and vapor seal and permitting the damage to the insulation that facing 10 is designed to prevent.

Figure 1A:
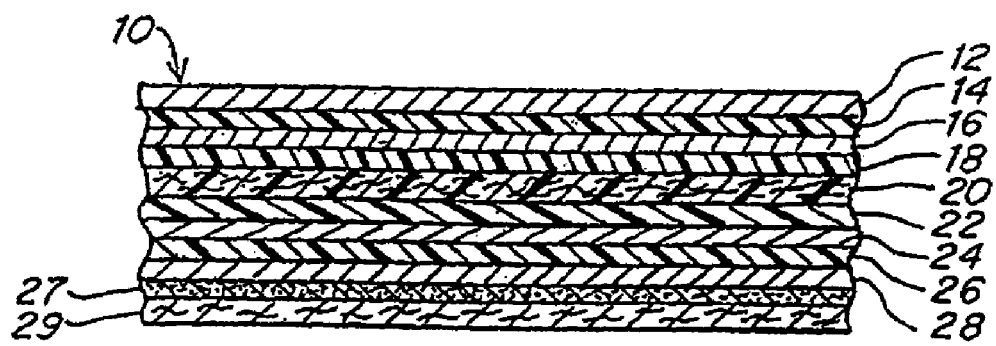
FIG. 1A is a cross-sectional view of a cutaway portion of another embodiment of the facing of this invention.
Figure 1B:
FIG. 1B is a cross-sectional view of a cutaway portion of yet another embodiment of the facing of this invention.

The embodiments illustrated in FIGS. 1, 1A and 1B represent a consideration of all of these factors and a balancing of the desired properties to achieve an optimal result. In one exemplary embodiment shown in FIG. 1, there are two structures 8 and 9 separated by a central layer 20. Each structure has at least one layer of a metal containing foil and at least one polymer layer. In one embodiment, the outer layers 12 and 28 on opposite sides of facing 10 are formed of a metal-containing foil, layers 14 and 26 are formed of a puncture-resistant polymer, layers 16 and 24 are formed of a metal-containing foil, and layers 18 and 22 are formed of an extrusion of a polymeric material.

Foil layers 12, 16, 24 and 28 typically are formed of a metal foil. In one embodiment, layers 12, 16, 24 and 28 are each formed of an aluminum foil. It is understood, however, that other metal foils could be used for layers 12, 16, 24 and 28, such as a stainless steel foil, a titanium foil, a copper foil or the like. In another embodiment, foil layers 12, 16, 24 and 28 may be formed of a metalized foil. Metalized foils suitable for use in this invention include conventional, commercially available foils in which a metal, such as aluminum, steel or titanium, is vapor deposited on a substrate formed of a polymer such as polyvinyl fluoride (sold under the trademark TEDLAR™), polyethylene or biaxially oriented polypropylene. Since metalized foils tend to have pinholes resulting from handling during manufacture or from other causes, it is preferred that not all of layers 12, 16, 24 and 28 be formed of a metalized foil. Preferably, at least one of layers 12, 16, 24 and 28 is formed of a metal foil, such as aluminum. Typically, at least layer 12 is formed of a metal foil, such as aluminum, since this layer is exposed to the elements. However, it is understood that layers 12 and 28 could be formed of a metalized foil, so long as one of layers 16 and 24 is formed of a metal foil. If only one of layers 12, 16, 24 and 28 is formed of a metal foil, it is preferred that such a layer have a thickness of at least 9 microns to provide the desired impermeabilty to moisture.

Layers 14 and 26 typically are formed of a polyester film, although other polymer films such as polypropylene, polyethylene, polyurethane, NYLON®, DACRON®, KEVLAR® or polytetrafluoroethylene could be used.

Layer 20 may be formed of any suitable material which preferably can withstand high temperatures. It is desirable, but not necessary, that layer 20 have a textured surface structure that will show through layers 12, 14, 16, 18, 22, 24, 26 and 28 to the surface of layers 12 and 28 so as to provide a texture to the surface of layer 12, and the surface of layer 28. The resulting textured surface tends to hide minor surface imperfections. Moreover, while the texture does show through, the resulting surface of layers 12 and 28 is relatively flat, which permits tight adhesion of pressure-sensitive tapes to provide a watertight bond. In one embodiment, layer 20 is formed of a fabric. One example of a suitable material for layer 20 is a high-density, polyethylene fabric. Another example of a suitable material for layer 20 is a NYLON® fabric. In one example, the fabric is a woven structure, although a knitted structure could also be used. A woven fabric suitable for use in layer 20 may, in one embodiment, be made using a 3 mm wide tape formed of high-density polyethylene film. The tape is woven to form a fabric structure in a conventional manner. In another embodiment, layer 20 may be formed of non-woven glass fibers which are compressed together. In yet another embodiment, layer 20 could be formed of a closed cell foam, such as an acrylic foam or a polyethylene foam. Such a foam layer would be especially suitable for applications in which an additional insulation effect is desired for facing 10. A layer of foam could also be used in addition to or together with a fabric layer for layer 20.

Layers 18 and 22 are polymer extrusions that serve to bond layer 20 to respective layers 16 and 24 as well as to provide additional strength, rigidity and conformability to the structure of facing 10. One material that may be used for these extrusion layers is a low-density polyethylene. One advantage of using low-density polyethylene for layers 18 and 22, when a non-woven fiberglass or a high-density polyethylene material is used for layer 20, is that low-density polyethylene melts at a lower temperature than high-density polyethylene or fiberglass and therefore can be used to bond layer 20 to layers 16 and 24 without degradation of layer 20. Other suitable materials which could be used for layers 18 and 22 include ethylene-vinyl acetate, ethylene acrylic acid, ethylene-methyl acrylate, linear low density polyethylene and SURLYN®.

Layers 12, 14 and 16 and layers 24, 26 and 28 typically are laminated or bonded together such as by an adhesive. This laminating adhesive could be a pressure-sensitive adhesive or any conventional, flame-retardant adhesive which is suitable for laminating a metal-containing foil to a polymer, and which has high strength and durability. In one embodiment, a conventional urethane laminating adhesive is used, such as a dual component, polyurethane adhesive. One example of a suitable adhesive is that sold under the name BOSCADUR™ and purchased from the Bostik™ Chemical Division of the Emhardt™ Fastener Group in Middleton, Massachusetts 01949. Another suitable adhesive is sold under the name ADCOTE™ by Rohm & Hass. A typical coating weight for these adhesives is about 2 to about 10 grams per square meter. Typical thicknesses of these laminating adhesives are about 0.3 to about 2.0 mils.

In one embodiment, where layers 12, 16, 24 and 28 are formed of an aluminum foil, each layer is about 25 microns in thickness. However, thicknesses as low as 5 microns also would be suitable for many applications, while thicknesses as great as 50 microns still could be acceptable, so long as facing 10 could be cut with a hand-held implement, such as a knife or scissors or the like, so long as facing 10 is still sufficiently manually conformable to be used to cover most types of insulation in most applications, and so long as facing 10 retains its shape once formed.

In one embodiment, where layers 14 and 26 are formed of a polyester film, layers 14 and 26 are about 23 microns in thickness. However, it is to be understood, that layers 14 and 26 could be thinner or thicker than 23 microns, depending upon the degree of puncture and tear resistance desired, and the material used. In fact, layers 14 and 26 could be as thin as 5 microns in certain applications, or as thick as 50 microns in other applications, so long as the resulting facing 10 is still adequately conformable to the shape of the fluid conduit, and the insulation surrounding it, so long as facing 10 can still be cut with a hand-held implement such as scissors or a knife or the like, and so long as facing 10 holds its shape once formed.

In most applications, facing 10 of this invention does not require a pressure-sensitive adhesive for application to insulation or other surfaces. Typically, facing 10 is manually curved or bent into the shape desired, and because facing 10 holds its shape once curved or bent, facing 10 does not require a pressure-sensitive adhesive to hold it in place. However, in certain applications, such as covering duct board or the like, a pressure-sensitive adhesive may be desired. In another embodiment, as illustrated in FIG. 1A, the structure of FIG. 1 may be modified by the application of a layer 27 of a pressure-sensitive adhesive to layer 28. Typically, prior to installation, layer 27 of a pressure-sensitive adhesive is covered by a release liner 29. Layer 27 of a pressure sensitive adhesive can be any commercially available, pressure-sensitive adhesive that is suitable for bonding to a metal or metalized foil and to kraft paper or other insulation surfaces, and that maintains it integrity under low and high temperature conditions. Examples of such suitable pressure-sensitive adhesives are disclosed in U.S. Pat. No. 4,780,347, which is specifically incorporated herein by reference. In particular, one suitable adhesive is a pressure-sensitive, acrylic adhesive, which, when cured, approaches a 100% acrylic compound in which substantially all solvents have been removed. This adhesive can, however, tolerate up to 1% solvents after curing and still perform as desired. When cured, layer 27 formed of this acrylic adhesive typically has a thickness of between about 1.0 and 5.0 mils and a coating weight of about 50 grams per square meter. This particular acrylic adhesive is especially desirable, since it remains tacky and usable at temperatures as low as −17° F. and as high as 284° F.

Release liner 29 can be any conventional release liner suitable for use with an acrylic adhesive. A typical release liner is a silicon-coated, natural kraft paper release liner rated at 70 pounds per ream.

In the embodiments of FIGS. 1 and 1A, in one particular embodiment, each of layers 12, 16, 24 and 28 is formed of an aluminum foil. In this particular embodiment, the thickness of each layer is about the same, or about 25 microns. It is understood, of course, that thicker or thinner layers of aluminum foil may be used for layers 12, 16, 24 and 28. Where a polyester material is used for layers 14 and 26, in one embodiment, the thickness of each layer 14 and 26 may be the same, and may be about 23 microns. It is understood, of course, that variations may be used in which layers 14 and 26 have different thicknesses.

In other embodiments, where a material other than polyester is used for layers 14 and 26, layers 14 and 26 may be either thicker or thinner than when polyester is used. For example, if layers 14 and 26 are formed of NYLON®, DACRON® or KEVLAR® or the like, these layers may be 30 microns in thickness.

In the embodiment of FIGS. 1 and 1A, in which layer 20 is formed of a high-density polyethylene fabric, layer 20 has a weight of about 60 grams per meter squared, in one embodiment. Where a fiberglass non-woven material is used for fabric layer 20, in one embodiment, layer 20 has a weight of about 50 grams per square meter. In another embodiment, where layers 18 and 22 are formed of a polyethylene extrusion, layers 18 and 22 may have a weight of about 20 grams per square meter to provide the desired stiffness and conformability.

FIG. 1B illustrates another embodiment of the facing 10 of this invention. Like numbers are used for like layers or parts where appropriate. In FIG. 1B, additional layers of a metal or metalized foil and a polymer are provided for additional puncture-resistance and increased resistance against tearing, as well as for further assurance that facing 10 is vapor proof. In the embodiment of FIG. 1B, an additional layer of a polymer and an additional layer of a foil are disposed on either side of central layer 20. The embodiment of FIG. 1B includes a first structure 11 including outer foil layer 12, polymer layer 14, foil layer 16, polymer layer 13 and foil layer 15, extrusion layer 18, central layer 20, extrusion layer 22, and a second structure 21 including foil layer 17, polymer layer 19, foil layer 24, polymer layer 26 and foil layer 28. As previously discussed, layers 12, 16, 15, 17, 24 and 28 typically are formed either of a metalized foil or of a metal foil. In one embodiment, each of these layers is formed of an aluminum foil. As noted previously, other metal foils could be used for these layers, such as a stainless steel foil, a titanium foil, a copper foil, or the like. Suitable metalized foils may also be used, as previously discussed. Layers 14, 13, 19, and 26 typically are formed of a polyester film, although other polymer films such as polypropylene, polyethylene, polyurethane, NYLON®, DACRON®, KEVLAR® or polytetrafluorethylene could be used. Layers 18, 20 and 22 are identical in all material respects to layers 18, 20, and 22 of FIGS. 1 and 1A. As discussed with respect to the embodiments of FIGS. 1 and 1A, layers 12, 14, 16, 13, 15, and layers 17, 19, 24, 26, and 28 are all typically laminated together such as by an adhesive which could be any conventional adhesive as described with respect to FIGS. 1 and 1A. Typically, although not necessarily, no pressure sensitive adhesive is applied to layer 28 of FIG. 1B. However, if a layer of pressure sensitive adhesive is desired, the same pressure sensitive adhesive used in conjunction with the embodiment of FIG. 1A may be applied on the outer surface of layer 28, along with an associated release liner.

In one particular embodiment of FIG. 1B, to achieve the combination of a desired barrier to vapor, stiffness, conformability and cutability by a hand-held implement, the layers of FIG. 1B may have the following compositions and thicknesses. It is understood, however, that the invention is not intended to be limited by this particular structure or by the thicknesses and compositions of the respective layers as set forth herein. In this particular embodiment, layers 12, 16, 15, 17, 24 and 28 may all be formed of an aluminum foil. Layer 12 is designed to be exposed to the elements, and may have a thickness of about 25 microns. The remaining layers of aluminum foil, layers 16, 15, 17, 24 and 28, each may have a thickness of about 9 microns. Layers 14, 13, 19 and 26, in this embodiment, are typically formed of polyester, and each layer typically has the same thickness, which may be about 23 microns. Layers 18 and 22 typically are formed of a low density polyethylene extrusion, while layer 20, typically, in this embodiment, is formed of a high density polyethylene woven fabric, as previously discussed. Layers 18 and 22 typically have a weight of about 20 grams per square meter, while fabric layer 20 has a weight of about 60 grams per square meter.

In the particular embodiment of FIG. 1B described immediately above, the total thickness of the facing 10 is about 350 microns. The weight of this particular embodiment is about 450 grams per square meter. The tensile strength as measured according to PSTC-31 is about 740 newtons per 25 millimeter width. The elongation at break is about 35 percent. The puncture resistance as measured in accordance with ASTM D-1000 is about 40 kilograms, while the tear strength as measured in accordance with ASTM D-624 is about 7.60 kilograms. The maximum continuous temperature tolerance is about 80 degrees centigrade. This embodiment of facing 10 has no permeability to water vapor, has a chemical and ultraviolet resistance which is comparable to that of aluminum and meets all flamability requirements for bulkhead, wall and ceiling linings.

For the particular embodiment of FIG. 1B described immediately above, a preferred flexural modulus as measured in accordance with ASTM D790-03, section 7.2.2, using procedure A, is greater than about $200 \times 10^3$ psi, with a preferred range of about $200 \times 10^3$ psi to about $500 \times 10^3$ psi. In one embodiment using a 368 micron thick specimen, a crosshead motion of 2.92 mm/minute, a deflection of 14.6 mm, and a support span of 25.4 mm, the flexural modulus was measured to be about $280 \times 10^3$ psi in the cross direction and $236 \times 10^3$ in the machine direction. The loading nose and supports had a diameter of 12.6 mm. In each instance the flexural strain was 0.05, while the flexural stress was $14.0 \times 10^3$ psi for the cross direction and $11.8 \times 10^3$ psi for the machine direction.

The embodiments of FIGS. 1, 1A and 1B typically may all be manufactured in substantially the same fashion. In one example, the first structure 8 of facing 10 comprised of the layers of foil and polymer, such as layers 12, 14, and 16 of FIGS. 1 and 1A, is separately bonded together. The second structure 9 comprised of layers 24, 26 and 28 of FIGS. 1 and 1A, also is separately bonded together. In the embodiment of FIG. 1B, the first structure 11 comprised of layers 12, 14, 16, 13 and 15 is separately bonded together, while the second structure 21 comprised of layers 17, 19, 24, 26 and 28 is also separately bonded together. In each instance, a laminating adhesive, as discussed above, such as a two-component polyurethane adhesive, coats the confronting surfaces of the layers to be bonded. Once surfaces of the layers are coated, the solvent, which is very volatile, is completely removed by evaporation before the surfaces to be bonded are contacted with one another. It is preferred that complete evaporation of the solvent is achieved before any bond becomes gas tight, to prevent any damage to the layers. Once the solvent has been evaporated, layers 12 and 16 are placed on opposite sides of layer 14, while layers 24 and 28 are placed on opposite sides of layer 26, for the embodiment of FIG. 1. In the embodiment of FIG. 1B, once the solvent has been removed, layers 12, 14, 16, 13 and 15 are aligned and arranged in the order shown in FIG. 1B, as are layers 17, 19, 24, 26, and 28. These structures of alternating foil and polymer layers are typically heated, rolled onto large rolls and stored, such as for about one week, to allow complete polymerization of the adhesive. Thereafter, layer 20 is coated on each side with a molten extrusion. The structure comprising layers 12, 14, and 16 is bonded at layer 16 to extrusion layer 18 on one side of layer 20, while the structure comprising layers 24, 26, and 28 is bonded to extrusion layer 22 at layer 24 on the other side of layer 20, for the embodiment of FIG. 1. With respect to the embodiment of FIG. 1B, the structure formed of layers 12, 14, 16, 13, and 15 is bonded at layer 15 to extrusion layer 18 on one side of layer 20, while the structure formed of layers 17, 19, 24, 26, and 28 is bonded along layer 17 to extrusion layer 22 on the other side of layer 20. Once the extrusion layers 18 and 22 are cooled and the resulting structure is compressed, such as by calendaring or by a machine press or the like, the resulting structure is complete.

Methods of use of facing 10 in various applications will now be described with reference to FIGS. 2-7. Before applying the facing 10 to any surface, the surface preferably is dry, clean and free from dust, oil and grease or silicone. Facing 10 should be cut to size prior to application. Typically, cutting to size is performed at the jobsite so that the worker can measure the fluid conduit or duct work on the spot and cut the facing to the precise size desired. Typically, facing 10 comes in large rolls which are unrolled and then cut with scissors, knives, box cutters or other hand-held implements. The sheets of facing 10 typically are applied in an abutting fashion where an edge of each sheet abuts the edges of adjacent sheets. Also, when wrapped about a conduit, the free edges of each sheet typically abut one another. The sheets of facing 10 could be applied in an overlapping fashion and if so, three inch (75 millimeter) overlap is preferred, in one embodiment. However, overlap usually is not necessary or desired. In each example illustrated below, the sheets of facing 10 are bent or otherwise manipulated to conform them to the surface to be covered. Because of their inherent rigidity, these sheets of facing 10 will retain their shape once formed and will tend to stay in place on the insulation surface or conduit being covered, once placed. Tape 68 typically is wrapped about the abutting edges of adjacent sheets of facing 10 to hold them in place and to seal all joints against water and water vapor.

Figure 8:
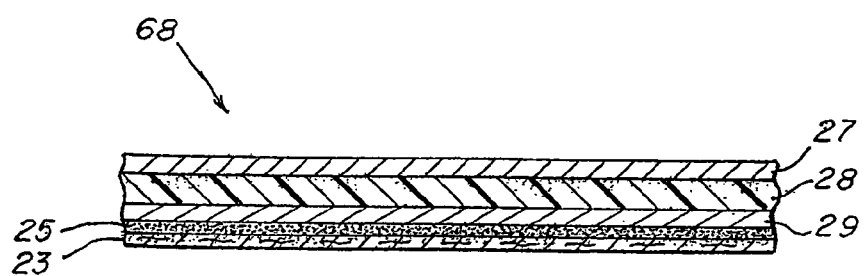
FIG. 8 is a cross-sectional view of a cutaway portion of a wrapping tape to be used in the method of this invention.

A tape 68 typically used with the facing 10 of this invention is a tape which has similar vapor barrier, weathering characteristics, and appearance as facing 10. In one example, as shown in FIG. 8, tape 68 is formed of a film 128 of a polymer disposed between two layers 127 and 129 of a metal-containing foil. The layers are laminated together using a laminating adhesive, like that used for facing 10. Layers 127 and 129 may be formed of a metalized foil or a metal foil such as aluminum, while the polymer film 128 can be formed of the same materials as layer 14 of facing 10, such as polyester. Layers 127 and 129 and polymer film 128 may be of the same construction and thickness as respective layers 12 and 14 found in facing 10. Typically, a pressure sensitive adhesive layer 125 is disposed on layer 129, and a release liner 123 is applied to the layer 125 of pressure sensitive adhesive prior to use of tape 68.

Figure 2:
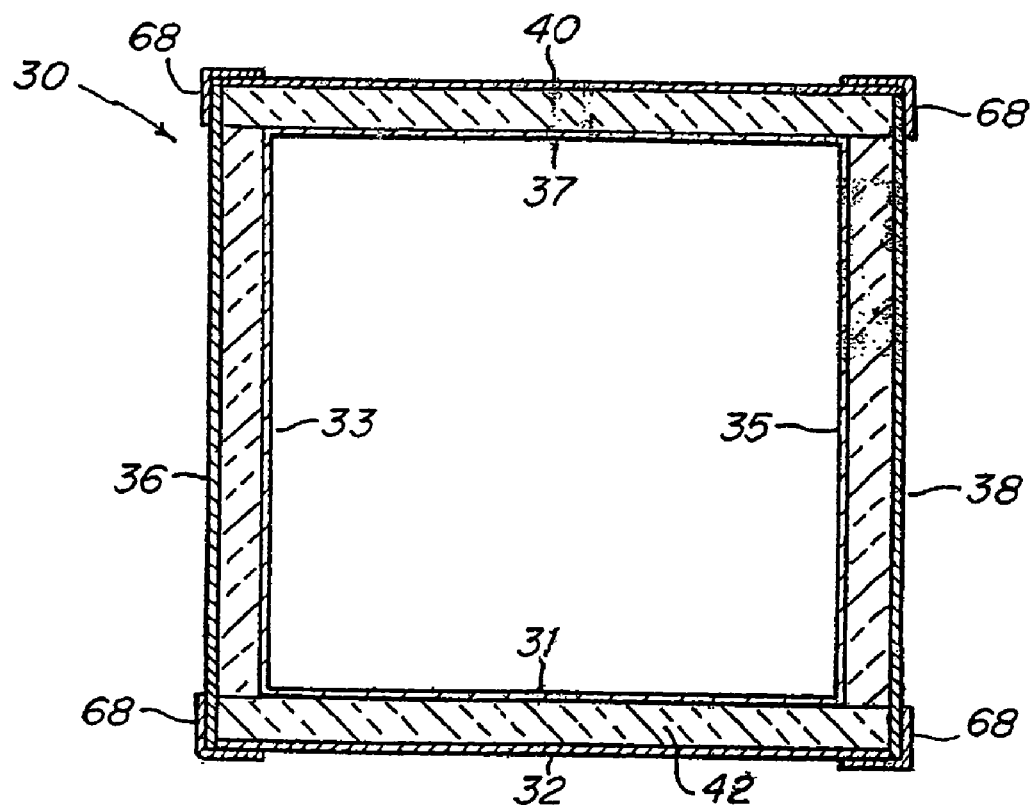
FIG. 2 is a cross-sectional, schematic view of rectangular ductwork illustrating a method for applying the facing of FIGS. 1, 1A and 1B to ductwork.

One method for applying a sheet of facing 10 to rectangular duct work 30 is illustrated in FIG. 2. Typically, one sheet 32 of facing 10 is applied to the bottom wall 31 of the duct 30, sheets 36 and 38 of facing are applied along respective walls 33 and 35, and top wall 37 is covered with sheet 40. Typically, a tape 68 may be used to seal all joints between abutting edges of sheets of facing 10. This process is repeated along the entire axial or longitudinal length of the duct work 30 with additional sheets of facing 10 that abut adjacent sheets in a longitudinal direction along circumferentially extending edges. This technique is particularly advantageous for large, flat horizontal ductwork upon the top wall 37 of which water tends to pool. By using a sheet on the top wall 37 that extends the width of the wall, there are no seams into which the pooled water may seep.

Figure 3:
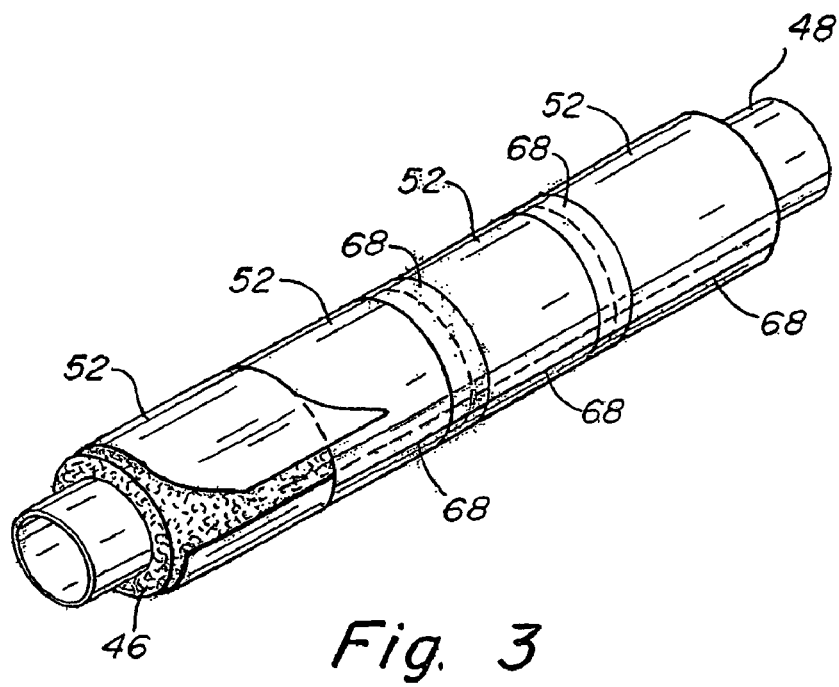
FIG. 3 is a perspective, schematic view illustrating a method for applying the facing of FIGS. 1, 1A and 1B to a cylindrical, straight pipe.

An example of a method of application of this facing 10 to a straight circular pipe 48 is illustrated in FIG. 3. In this example, a series of sheets 52 having the same width and length are cut from rolls of the facing 10 prior to installation. Each sheet 52 is sized so that when wrapped about the insulation 46 on pipe 48, axially extending edges are in abutment. Similarly, when successive sheets 52 are applied, adjacent edges on each successive sheet 52 in an axial direction should be in abutting relation. Each sheet 52 is otherwise applied in the same manner as described with respect to FIG. 2, and the joints between abutting sheets and portions of the same sheet may be sealed with a strip of tape 68.

Figure 4:
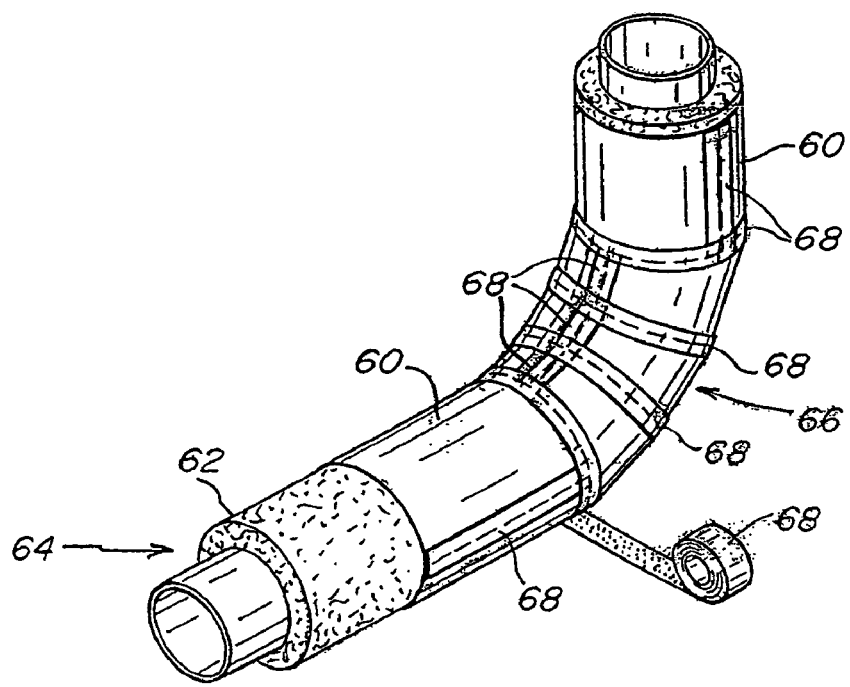
FIG. 4 is a perspective, schematic view illustrating a method for applying the facing of FIGS. 1, 1A and 1B to a curved pipe.

FIG. 4 illustrates one example of the application of facing 10 to a curved pipe 64. Initially, sheets 60 are applied in a manner virtually identical to sheets 52 of FIG. 3. Successive sheets 60 are cut and applied in an abutting relation to insulation 62 along the axial length of pipe 64. One difference between the method of FIG. 3 and that of FIG. 4 is that the sheets 60 applied to the curved portion 66 of pipe 64 typically are narrower in width in an axial direction than sheets 60 covering the straight portion of the pipe 64, since facing 10 may not conform as easily to the shape of the curved portion 66 of the pipe 64 as it does to the straight portions because of its inherent rigidity. To assist in conforming sheet 60 to the shape of the curved portion 66 of the pipe 64, and to seal all joints between abutting sheets of facing 10, it is desirable to apply a wrapping of a tape 68 at axially spaced intervals and over abutting edges, as shown. Tape 68 typically is wrapped so as to overlap itself circumferentially and should be applied at whatever axial intervals are necessary to conform sheet 60 to the shape of curved portion 66.

Figure 5:
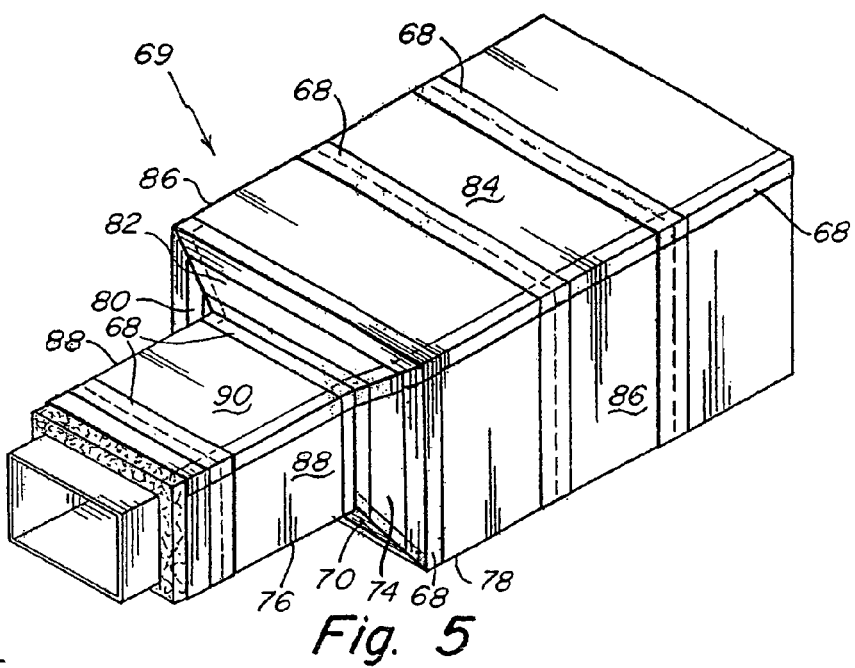
FIG. 5 is a perspective, schematic view illustrating a method for applying the facing of FIGS. 1, 1A and 1B to a reduced portion of rectangular ductwork.

FIG. 5 illustrates one example of the application of facing 10 to a reduced section of duct work 69. A first trapezoidal segment of facing is cut and applied to surface 70. Next, trapezoidal segments of facing are cut for surfaces 74 and 80. Thereafter, a final trapezoidal segment of facing is cut and applied to surface 82. Next, sheets are cut having the necessary circumferential length to be wrapped about surfaces 76, 88 and 90. Finally, sheets of facing are cut to be wrapped about surfaces 78, 84 and 86. Each sheet is applied as previously described in abutting relation with adjoining sheets, and the abutting edges are sealed with tape 68.

Figure 6A:
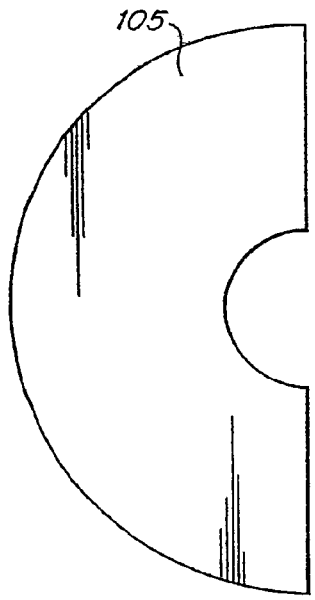
FIG. 6A is a plan view of a precut facing segment to be applied to a tapered portion of a reduced pipe.
Figure 6:
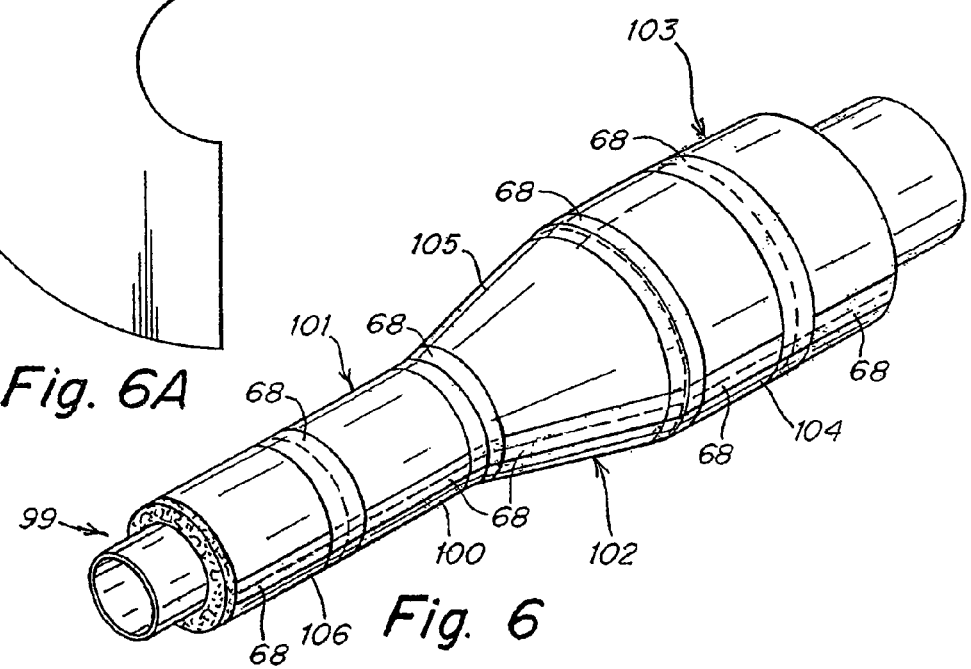
FIG. 6 is a perspective, schematic view illustrating a method for applying the facing of FIGS. 1, 1A and 1B to a reduced pipe.

FIG. 6 illustrates one example of the application of facing 10 to a reduced pipe 99. Typically, a sheet of facing is first applied to surface 100 which is the reduced portion 101 of the pipe 99 just adjacent the tapered portion 102. A sheet of facing is cut and wrapped about surface 100 in the manner previously described. Thereafter, a C-shaped section 105 of facing (see FIG. 6A) is cut and applied to the tapered portion 102. Sheets of facing 10 then are cut and applied to surface 104 of the enlarged portion 103 of the pipe 99. These sheets are applied one adjacent another in abutting relation along the length of surface 104. Finally, sheets of facing are applied to surface 106 in abutting relation with one another along the axial length, and in abutting relation along axially extending edges with themselves. Abutting edges are again sealed with tape 68.

Figure 7A:
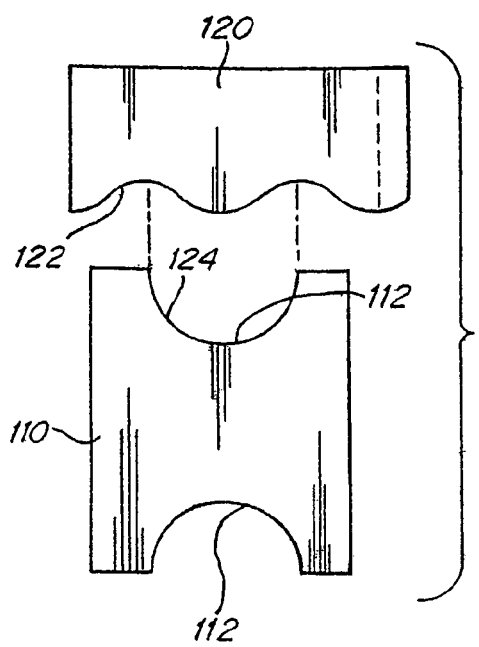
FIG. 7A is a plan view of precut facing segments to be applied to a T-section pipe.
Figure 7:
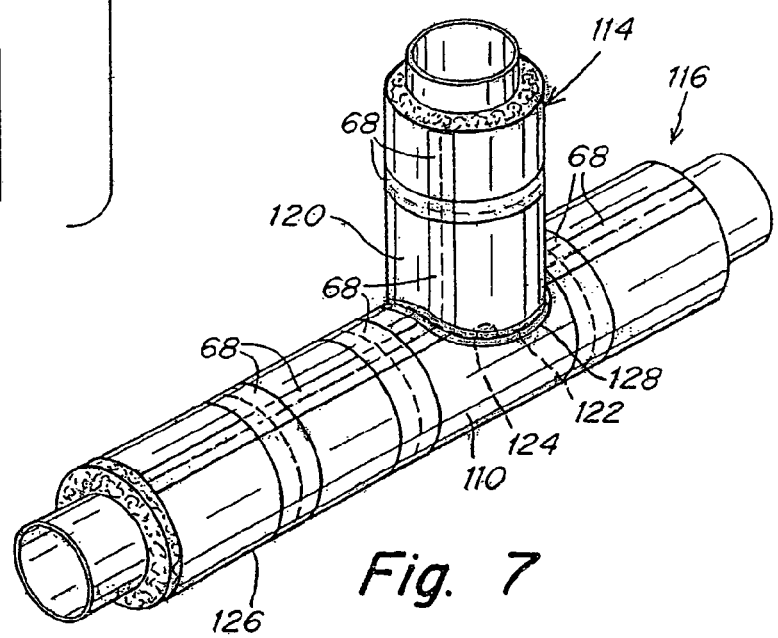
FIG. 7 is a perspective, schematic view illustrating a method for applying the facing of FIGS. 1, 1A and 1B to a T-section pipe.

FIGS. 7 and 7*a* illustrate one example of the application of facing 10 to a T section of a pipe 116. A first sheet 110 is cut having the configuration shown in FIG. 7*a*. Sheet 110 is provided with cutouts 112 to accommodate the T section 114 of pipe 116. A sheet 120 is cut to the shape shown in FIG. 7*a*. Sheet 120 is then applied to section 114 in the manner shown. Thereafter, additional abutting sheets may be applied to segment 114, as well as to portion 126, as previously described with respect to a straight pipe in FIG. 3. Preferably a length of tape 68 is applied at the junction of edges 122 and 124 to effect a vapor tight seal and all other abutting edges are similarly sealed with tape 68.

The facing 10 of this invention, when used with insulation for a fluid conduit, such as a pipe or duct work, provides a vapor tight seal about the insulation and duct work or pipe that is weather resistant, puncture and tear resistant, sufficiently flexible, easily cut, and aesthetically pleasing. Facing 10 can be applied in almost all weather conditions, and in a temperature range from minus 17° to plus 284° Fahrenheit. The resulting sealed pipe or duct work is fire resistant, and any flame would spread very slowly. Facing 10 can be easily repaired onsite, and has a long life.

The method of this invention provides an easy technique for applying facing to insulation disposed on duct work or on pipes and can be mastered with very little training or skill. Installation is fast, clean and safe. Only scissors, a knife or the like are required as tools, and all work can be done at the job site. No prior or cutting or assembly is required.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A combination of a covering for insulation and insulation, said combination comprising:
   a layer of insulation having a first side and a second side;
   a covering material comprising:
      a central layer;
      a polymer layer disposed on each side of the central layer; and
      two structures, one structure affixed to each polymer layer, each structure comprising at least two layers of a metal containing foil having a layer of a puncture resistant polymer film disposed therebetween; and
   a layer of adhesive bonding said covering material to said first side of said layer of insulation;
   wherein the metal layer of each metal containing foil has a thickness of 5 to 50 microns.

2. The combination as recited in claim 1, wherein the metal containing foil in each said structure comprises a sheet of aluminum foil.

3. The combination as recited in claim 1, wherein the puncture resistant polymer film in each said structure comprises a polyester film.

4. The combination as recited in claim 1, wherein the central layer comprises a woven fabric.

5. The combination as recited in claim 1 wherein the central layer is formed of polyethylene.

6. The combination as recited in claim 1, wherein the central layer is formed of a non-woven fiberglass material.

7. The combination as recited in claim 1, wherein each polymer layer is formed of a low density polyethylene.

8. The combination as recited in claim 1, wherein the covering material is sufficiently rigid to substantially retain a shape once formed into that shape, and wherein the covering material may be cut using a hand-held implement with a sharp edge.

9. The combination as recited in claim 1, wherein the covering material has a total thickness of about 350 microns.

10. The combination as recited in claim 1, wherein at least one of said structures comprises three layers of a metal containing foil and two layers of a puncture resistant polymer film, at least one of the layers of a metal containing foil being disposed on an outer surface of the covering material on a side of said covering material opposite said layer of insulation.

11. The combination as recited in claim 10, wherein with respect to said at least one structure, the layer of a metal containing foil disposed on the outer surface of said covering material is approximately 25 microns in thickness, and wherein all of the other layers of a metal containing foil are approximately 9 microns in thickness, and wherein all the layers of a puncture resistant polymer film are approximately 23 microns in thickness.

12. The combination of claim 1, wherein each of said two structures comprises:
    a first outer layer of aluminum foil, said first outer layer having an outer surface and an inner surface;
    a first layer of polyester bonded to the inner surface of the first outer layer of aluminum foil; and
    a second layer of aluminum foil bonded to said first layer of polyester.

13. The combination as recited in claim 12, wherein each of said two structures further comprises a third layer of aluminum foil and a second layer of polyester disposed between said second and third layers of aluminum foil.

14. The combination as recited in claim 12, wherein each layer of aluminum foil has a thickness of no greater than about 25 microns and wherein said first layer of polyester has a thickness no greater than about 23 microns.

15. The combination as recited in claim 1, further comprising duct work disposed adjacent said second side of said layer of insulation.

16. The combination as recited in claim 1, further comprising a pipe disposed adjacent said second side of said layer of insulation.

17. The combination as recited in claim 1, further comprising:
    at least one seam formed between adjacent portions of said covering material; and
    a pressure-sensitive adhesive tape covering said seam.

18. The combination as recited in claim 1, wherein said layer of adhesive includes a pressure-sensitive adhesive that remains tacky in a temperature range of from about minus 17° Fahrenheit to about 284° Fahrenheit.

19. The combination as recited in claim 18, wherein the pressure-sensitive adhesive includes an isooctyl acrylate polymer.

20. The combination as recited in claim 1, wherein said layer of adhesive includes a pressure-sensitive adhesive that remains sufficiently tacky to bond said covering material to said layer of insulation without the application of heat or pressure in excess of manual pressure.

21. The combination as recited in claim 1, wherein said layer of adhesive is bonded to a paper layer disposed on said first side of said layer of insulation.

22. A combination comprising:
    a fluid conduit;
    a layer of insulation covering said fluid conduit;
    a weather seal covering said layer of insulation on said fluid conduit, said weather seal comprising:
        a central layer consisting of a fabric; and
        two structures, one structure bonded to each side of said central fabric layer, each said structure comprising multiple alternating layers of a metal foil and a puncture resistant polymer film bonded together with an adhesive;
    said weather seal being manually bendable into a desired configuration that conforms to a shape of said fluid conduit, said weather seal substantially retaining the desired configuration once a manual force is removed, said weather seal being manually cutable with a hand-held implement; and
    a layer of adhesive bonding said weather seal to said layer of insulation.

23. The combination as recited in claim 22, further comprising a polymer extrusion disposed on either side of the central fabric layer for bonding the two structures to the central fabric layer.

24. The combination as recited in claim 22, wherein said weather seal has a puncture resistance of at least 40 kilograms as measured in accordance with ASTM D-1000 and a tear strength of at least 7.60 kilograms as measured in accordance with ASTM D-624.

25. The combination as recited in claim 22, wherein a total thickness of the weather seal is about 350 microns.

26. A combination of a covering for insulation and insulation, said combination comprising:
    a layer of insulation having a first side and a second side;
    a covering material comprising:
        a central layer;
        a polymer layer disposed on each side of the central layer; and
        two structures, one structure affixed to each polymer layer, each structure comprising at least two layers of a metal containing foil having a layer of a puncture resistant polymer film disposed therebetween; and
    a layer of adhesive bonding said covering material to said first side of said layer of insulation, wherein one of said two structures is disposed on a side of said central layer opposite said layer of insulation and includes an uncovered layer of the metal layer of a metal-containing foil that is disposed on an exposed, outer surface of said covering material.

* * * * *